Sept. 16, 1930.　　W. S. THIMBLETHORPE　　1,776,170
DEVICE FOR INDICATING THE LEVEL AND THE TEMPERATURE
OF LIQUID IN RADIATORS OF MOTOR VEHICLES
Filed Nov. 19, 1929
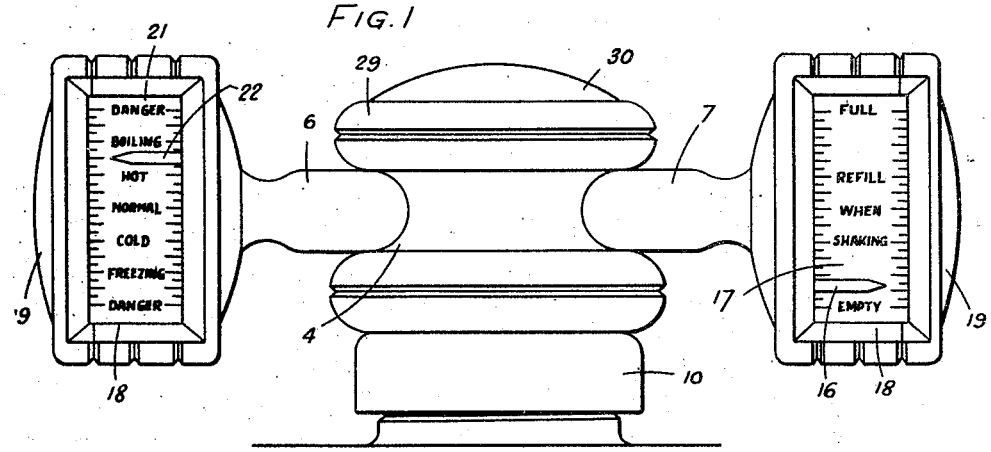
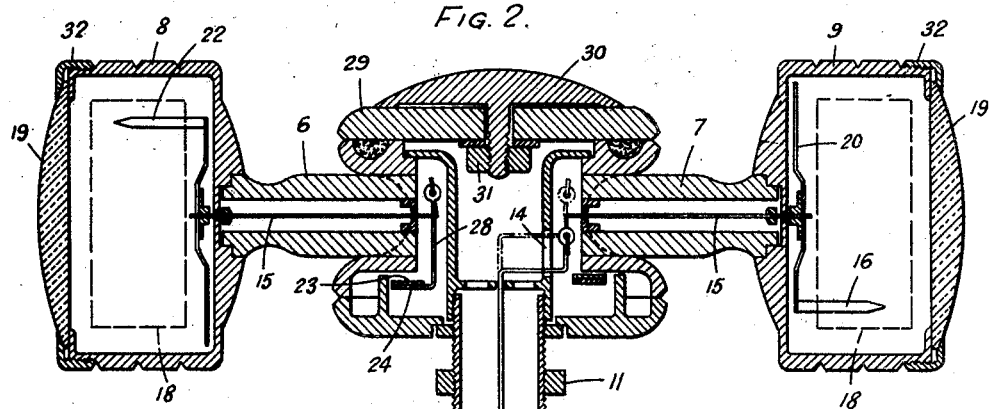
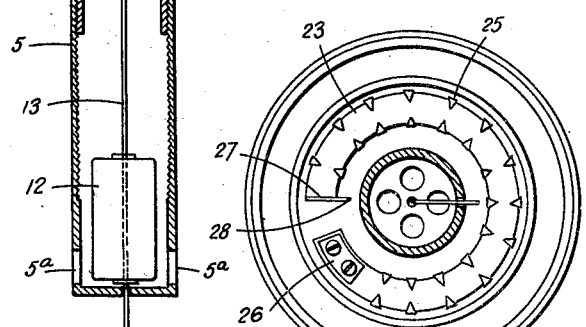
Inventor
Wilfred S. Thimblethorpe
by Wilkinson & Giusta
Attorneys.

Patented Sept. 16, 1930

1,776,170

UNITED STATES PATENT OFFICE

WILFRED SYLVESTER THIMBLETHORPE, OF LONDON, ENGLAND

DEVICE FOR INDICATING THE LEVEL AND TEMPERATURE OF LIQUID IN RADIATORS OF MOTOR VEHICLES

Application filed November 19, 1929, Serial No. 408,373, and in Great Britain December 13, 1928.

This invention relates to a device applicable to the radiator of a motor vehicle for the purpose of visibly indicating both the level and the temperature of the water or other liquid in the radiator.

According to the invention the level and temperature indicating means are arranged on the opposite sides of a fitting adapted to form part of or to replace the usual radiator cap, the fitting also comprising, if desired, electric lamps so arranged that the device serves the purpose of a safety device shewing a red light on the near side and a green light on the offside, for example. The indicators may also be arranged to cut out the electrical ignition of the car engine in case the water in the radiator runs dangerously low or becomes dangerously heated.

To enable the invention to be fully understood it will now be described by reference to the accompanying drawings in which:—

Fig. 1 is an elevation of a device constructed according to one form of the invention arranged on the radiator of a motor vehicle, as seen from the driver's seat, and Fig. 2 is a sectional elevation thereof.

Fig. 3 is a sectional plan view shewing a form of temperature sensitive device which may be used.

As shewn the device comprises a central hollow boss 4 having a depending tubular portion 5 and two tubular arms 6, 7, extending at right angles thereto and carrying at their free ends preferably cylindrical casings 8, 9 for containing and exhibiting the temperature and level indicating means respectively. The device is adapted to take the place of the radiator cap and to be secured over the filling opening with the depending tube 5 extending into the water space within the radiator. Holes 5ª are provided at the bottom of the tube 5. The usual radiator cap 10 (Fig. 1) may have a hole drilled and tapped therein and the tube 5 may be externally screw threaded to enable it to be screwed into the hole, a lock nut 11 being fitted for securing it to the cap. Or the radiator cap may be removed and the device screwed into the filling opening of the radiator. Inside the tube 5 a float 12 is arranged, carried on a light wire rod 13, which is guided at the top and bottom of the tube as shewn while at its upper end the rod is bent and passes out through an opening 14 in the side of the tube within the boss and is connected to a rod 15 mounted in the tubular arm 7 which operates an indicating pointer 16 riding over a suitable scale 17 arranged within the casing 9. The casing is fitted with a window 18 through which the scale and pointer are visible, the arrangement being such that when the device is in position on the radiator the scale is visible to the driver or occupant of the car or the like. The casing may also contain an electric lamp for illuminating the scale at night (not shewn) and the end of the casing may be fitted with a lens 19 of suitable colour so that at night the device provides a side light for safety purposes. The indicating pointer 16 is carried on a balanced arm 20 which is attached to the operating rod 15 and at right angles thereto. The float rod 13 and the pointer operating rod 15 are preferably of thin steel rod about ½ millimeter diameter or of 20 gauge steel wire and the rod 15 is rotatably supported in suitable bearings or bushings in the tubular arm. The free ends of the two rods 13, 15 may be connected together as shewn or in any suitable manner so that the movements of the float 12 cause the requisite movements of the pointer 16.

The temperature indicator is arranged in the casing 8 on the other tubular arm 6 and comprises a suitable scale 21 and balanced pointer 22 connected by a rod 15 similar to that of the water level indicator. The free end of the rod 15 is connected to a temperature sensitive device arranged within the base of the boss 4 and outside the tube 5, that is to say, it is outside the radiator cap proper and is only influenced by radiation from the tube and by the atmosphere. The temperature sensitive device (Figs. 2 and 3) is shewn as comprising a strip of steel 23 and a strip of brass 24 superposed and secured together by clips 25 and bent into the form of a spring washer or spiral, one end 26 being anchored and the free end 27 attached to the operating rod 15 of the indicator by a rod 28. Any other suitable temperature sensitive device may be used. The casing 8 is further fitted with a window 18, a lens 19 and if desired with a lamp and the scale is visible to the driver, all as in the case of the water level indicator.

The top of the boss is in the form of a hinged cap 29 which can be released and opened when it is desired to fill the radiator, the depending tube 5 extending right up to the top of the boss beneath the cap and acting as a filling tube. This tube 5 may be formed in several sections, connected by screw threads as shewn to enable its length to be adjusted or it may be a telescopic tube of suitable construction. The cap 29 may be made as shewn with a detachable dome top 30 held in place by a screw and nut 31. When the dome is removed a flat top is left on which the usual mascot, badge, signal lamp or the like may be screwed without disturbing the other portions of the device.

It will be understood that when electric lamps are used within the casings 8, 9, they are suitably wired into the electric lighting system of the vehicle and may be controlled by a switch on the dashboard. The lens 19 in each casing may be secured by a screwed ring 32 so that it may be removed and access obtained to the interior of the casing. The scales 17 within the casings 8, 9 are preferably translucent and may bear any desired markings. The scales may be changed as desired by removing the lens. If the device is not required for use as a safety signal, the ends of the casings 8, 9 may be closed by detachable caps for example and the lenses omitted.

Further one or both indicating pointers 16, 22, may be wired electrically in series with the ignition of the engine of the car and suitable contacts arranged so that the ignition can be cut automatically if the water level falls to danger point or the temperature rises to a dangerous degree.

Instead of the float arrangement illustrated, the float may be in the form of a ball or the like connected to the rod 15 by a light chain or like flexible connection the arm 20 being suitably weighted if necessary, the depending tube 5 being considerably shortened if desired. This arrangement may be used in cases where the radiator overflow pipes for example would obstruct the passage of a long depending tube and rigidly connected float. The flexibly suspended ball can easily pass such obstructions as will be readily understood.

Having thus described the nature of my said invention and the best means I know of carrying the same into practical effect, I claim:—

1. A device for indicating the liquid level and the temperature of the liquid in the radiator of a motor vehicle comprising in combination, a central hollow boss, a depending tube attached to said boss adapted to extend into the liquid space within the radiator, two tubular arms attached to the boss and extending at right angles to the depending tube, casings arranged one on each free end of the tubular arms, a float in the depending tube, a pivoted level indicating pointer in one of the casings, an operative connection between the float and the pointer, a level indicating scale in the said casing, cooperating with the pointer and temperature indicating means arranged in the other casing.

2. A device for indicating the liquid level and the temperature of the liquid in the radiator of a motor vehicle comprising in combination, a central hollow boss, a depending tube attached to said boss adapted to extend into the liquid space within the radiator, two tubular arms attached to the boss and extending at right angles to the depending tube, casings arranged one on each free end of the tubular arms, a temperature sensitive device arranged within the base of the boss and outside the depending tube, a pivoted temperature indicating pointer in one of the casings, an operative connection between the pointer and the temperature sensitive device, a temperature scale in said casing cooperating with the pointer and liquid level indicating means arranged within the other casing.

3. A device for indicating the liquid level and the temperature of the liquid in the radiator of a motor vehicle comprising in combination a central hollow boss, a depending tube attached to said boss and extending into the liquid space within the radiator and having an opening in the lower end thereof, two tubular arms attached to the boss and extending at right angles to the depending tube, casings arranged one on each free end of the tubular arms, a temperature sensitive device arranged within the base of the boss and outside the depending tube, and exposed to and actuated by changes of temperature in said tube, a pivoted temperature indicating pointer in one of the casings operatively connected to the temperature sensitive device, a temperature scale in said casing cooperating with the pointer, a float in the depending tube, a pivoted level indicating pointer in the other casing, operatively connected to the float, and a level indicating scale in the said other casing cooperating with the said pointer.

In testimony whereof I have signed my name to this specification.

WILFRED SYLVESTER THIMBLETHORPE.